(12) United States Patent (10) Patent No.: US 12,652,730 B2
Rotem et al. (45) Date of Patent: Jun. 9, 2026

(54) INDUCTION-ASSISTED GLUING SYSTEM AND METHOD

(71) Applicant: Nemo Power Tools Ltd., Sheung Wan (HK)

(72) Inventors: Nimrod Rotem, Sheung Wan (HK); Efraim Rotem, Santa Clara, CA (US); Ariel Rotem, Hoboken, NJ (US)

(73) Assignee: Grabo LTD, Sheung Wan (HK)

( * ) Notice: Subject to any disclaimer, the term of this patent is extended or adjusted under 35 U.S.C. 154(b) by 303 days.

(21) Appl. No.: 18/126,148

(22) Filed: Mar. 24, 2023

(65) Prior Publication Data

US 2024/0324075 A1 Sep. 26, 2024

(51) Int. Cl.
*H05B 6/10* (2006.01)
*C09J 7/35* (2018.01)

(52) U.S. Cl.
CPC .................. *H05B 6/10* (2013.01); *C09J 7/35* (2018.01); *C09J 2301/204* (2020.08); *C09J 2301/304* (2020.08); *C09J 2301/314* (2020.08); *C09J 2301/408* (2020.08); *C09J 2301/50* (2020.08)

(58) Field of Classification Search
None
See application file for complete search history.

(56) References Cited

U.S. PATENT DOCUMENTS

| | | | |
|---|---|---|---|
| 10,099,458 B2 | 10/2018 | Haq et al. | |
| 11,141,931 B2 | 10/2021 | Penumadu | |
| 11,248,633 B2 | 2/2022 | Freitag | |
| 11,597,161 B2 | 3/2023 | Eguchi et al. | |
| 11,623,753 B2 | 4/2023 | Ching et al. | |
| 2004/0050839 A1* | 3/2004 | Riess ..................... | B23K 13/01 |
| | | | 219/603 |

(Continued)

FOREIGN PATENT DOCUMENTS

| | | |
|---|---|---|
| EP | 2796272 B1 | 10/2014 |
| JP | 6912316 B2 | 2/2019 |

(Continued)

OTHER PUBLICATIONS

Banea, M.D.; da Silva, L.F.M.; Carbas, R.J.C. (2015). Debonding on command of adhesive joints for the automotive industry. International Journal of Adhesion and Adhesives, 59( ), 14-20. doi:10. 1016/j.ijadhadh.2015.01.014.

(Continued)

*Primary Examiner* — Abbas Rashid
*Assistant Examiner* — Adrianna N Konves
(74) *Attorney, Agent, or Firm* — Intellent Patents LLC; Ahmed Alhafidh

(57) ABSTRACT

An inductive gluing sheet is utilized in an induction-assisted adhesive activation method in which the inductive gluing sheet includes a heat-activated adhesive substrate and a conductive substrate embedded therein. When a magnetic field is applied to the conductive substrate through a first surface or a second surface covering the inductive gluing sheet, an electric current is induced in the conductive substrate. The heat created by the electric current transfers to the heat-activated adhesive substrate via conduction and activates the heat-activated adhesive substrate. This allows for direct heating of an adhesive layer through one or more objects and even allows for reversibility of the adhesion setting process.

6 Claims, 4 Drawing Sheets

(56) References Cited

U.S. PATENT DOCUMENTS

| | | | | |
|---|---|---|---|---|
| 2005/0274454 A1* | 12/2005 | Extrand | ........... | C09J 11/04 |
| | | | | 428/323 |
| 2007/0187395 A1* | 8/2007 | Lovens | ........... | H05B 6/06 |
| | | | | 219/645 |
| 2012/0279647 A1* | 11/2012 | Staiger | ........... | C09J 5/06 |
| | | | | 156/583.1 |
| 2016/0284449 A1* | 9/2016 | Haq | ........... | B29C 66/9192 |
| 2019/0240917 A1 | 8/2019 | Mayer et al. | | |
| 2020/0317957 A1 | 10/2020 | Sweeney et al. | | |
| 2021/0024785 A1 | 1/2021 | Nagar | | |
| 2021/0229370 A1 | 7/2021 | Ciardiello et al. | | |
| 2021/0276290 A1 | 9/2021 | Stavrinadis et al. | | |

FOREIGN PATENT DOCUMENTS

| | | |
|---|---|---|
| WO | 2020069829 A1 | 4/2020 |
| WO | 2021070987 A1 | 4/2021 |

OTHER PUBLICATIONS

Ciardello, et al., "Physical and Mechanical Properties of a Reversible Adhesive for Automotive Applications", Politecnico di Torino, Department of Mechanical and Aerospace Engineering, Corso Duca degli Abruzzi 24, 10129 Torino, Italy, https://iris.unito.it/bitstream/2318/1700523/4/post%20print2.pdf.

Vattathurvalappil, Suhail Hyder; Hassan, Syed Fahad; Haq, Mahmoodul (2020). Healing potential of reversible adhesives in bonded joints. Composites Part B: Engineering, 200( ), 108360-. doi:10.1016/j.compositesb.2020.108360.

Vallée, T., & Adam, M. (2016). Inductively cured glued-in rods in timber using Curie particles. International Journal of Adhesion and Adhesives, 70, 37-45. doi:10.1016/j.ijadhadh.2016.05.005.

Ciardiello, R., Belingardi, G., Litterio, F., & Brunella, V. (2020). Thermomechanical characterization of reinforced and dismountable thermoplastic adhesive joints activated by microwave and induction processes. Composite Structures, 244, 112314. doi:10.1016/j.compstruct.2020.112314.

Cheng, X., Zhou, Y., Charles, A. D. M., Yu, Y., Islam, M. S., Peng, S., . . . Wang, C.-H. (2021). Enabling contactless rapid on-demand debonding and rebonding using hysteresis heating of ferrimagnetic nanoparticles. Materials & Design, 210, 110076. doi:10.1016/j.matdes.2021.110076.

R. Ciardiello;G. Belingardi; F. Litterio; V. Brunella;. (2021). Effect of iron oxide and graphene particles on joint strength and dismounting characteristics of a thermoplastic adhesive . International Journal of Adhesion and Adhesives, ( ),—. doi:10.1016/j.ijadhadh.2021.102850.

* cited by examiner

100

112

109

108

107

104

106

102

110

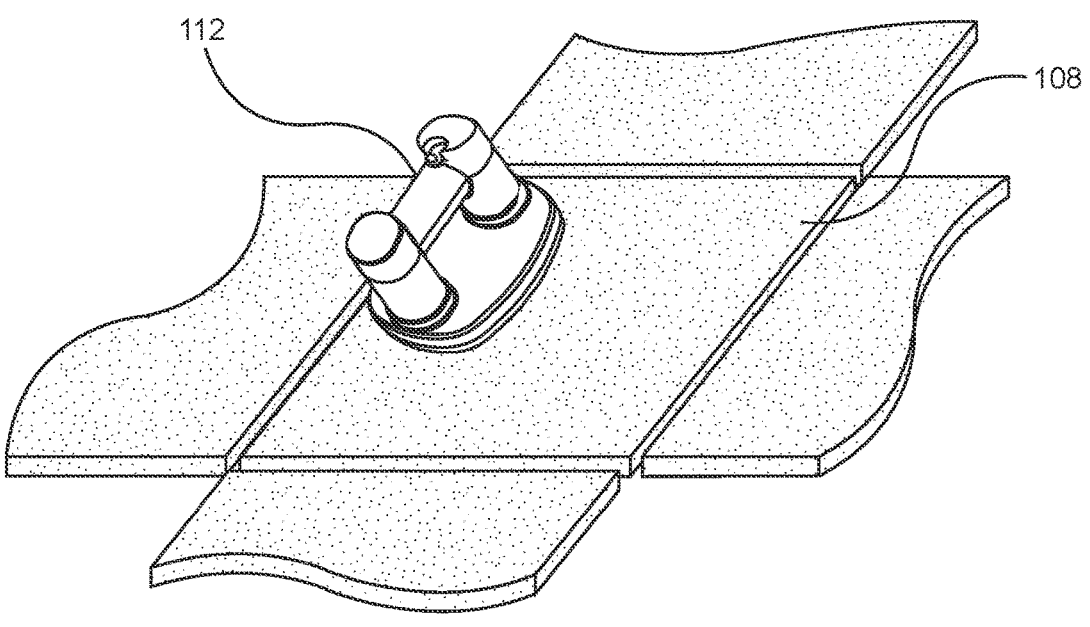
FIG. 2
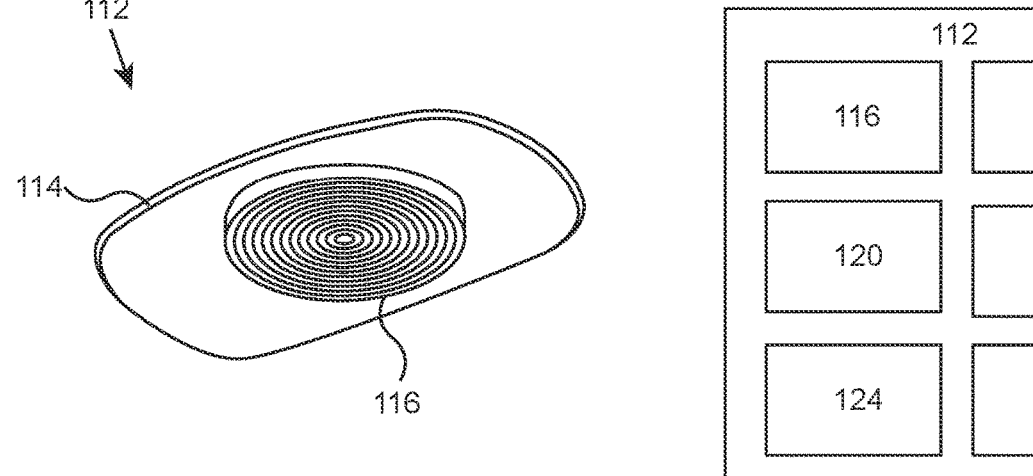
FIG. 3A                      FIG. 3B

128 ⟶   102

104

124

130 ⟶

102

126

132 ⟶

128

102

104

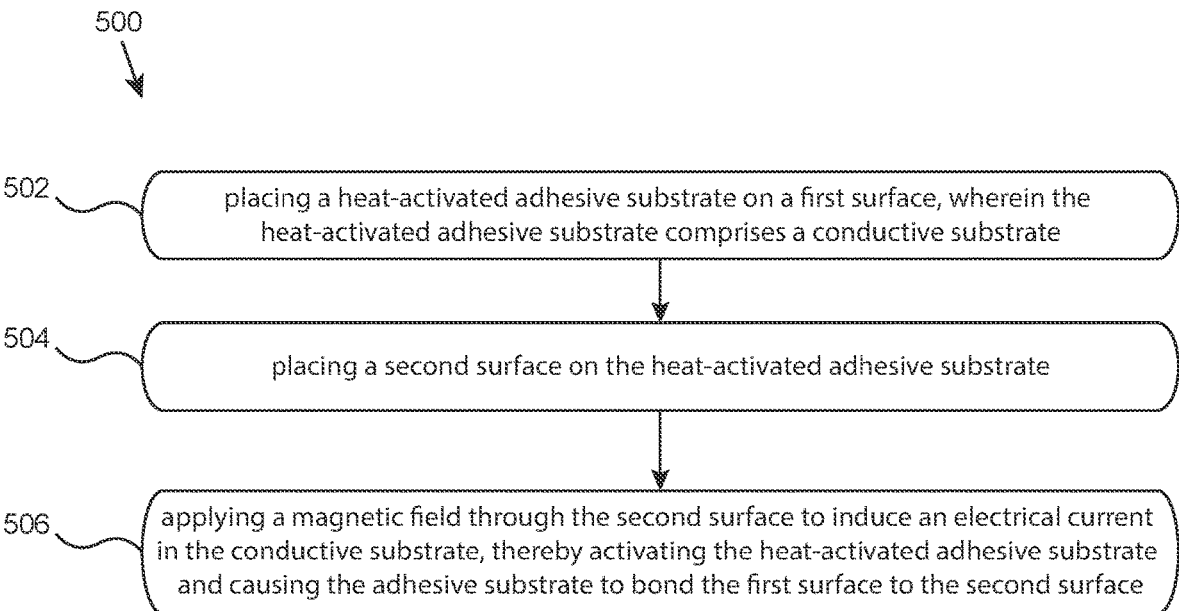

500

502     placing a heat-activated adhesive substrate on a first surface, wherein the heat-activated adhesive substrate comprises a conductive substrate 504     placing a second surface on the heat-activated adhesive substrate 506     applying a magnetic field through the second surface to induce an electrical current in the conductive substrate, thereby activating the heat-activated adhesive substrate and causing the adhesive substrate to bond the first surface to the second surface

FIG. 5

INDUCTION-ASSISTED GLUING SYSTEM AND METHOD

FIELD OF TECHNOLOGY

This disclosure relates generally to a system and method of adhering objects and, more particularly, to an induction-assisted gluing system and method.

BACKGROUND

Heat-activated adhesives or 'hot glues' are commonly used in projects to hold surfaces together in a temporary or permanent fashion, but in manufacturing and construction environments, their uses are limited to light duty tasks. Their heat-sensitive nature leaves a narrow window of working time, making large-scale projects that require precision positioning impossible to achieve. This is because heat-activated adhesives are typically applied to an object's surface using a hot glue gun or other heated applicator and then the object's surface is combined with another object's surface before it cools. Reversing the process involves applying an external heat source (usually a heat gun) to the heat-activated adhesive through either object. Sufficient heat may not be able to reach the entire adhesive layer or even any portions thereof, especially for thicker objects. In addition, heat sources used are typically heat guns which apply heat to an external surface of an object. This makes it impossible to use heat-activated adhesives with materials that may degrade or burn if subject to direct heat for a prolonged period of time, such as plastics or wood.

Thus, there exists a need for an adhesive-activation method which efficiently transfers heat directly to the adhesive layer and allows re-activation of the adhesive layer after setting as necessary in a fraction of the time compared to contemporary methods.

SUMMARY

Disclosed is a system and method of induction heating of an adhesive using an inductive gluing sheet. In one aspect, a system of induction heating of an adhesive involves a heat-activated substrate and a conductive substrate embedded within the heat-activated adhesive substrate. The heat-activated substrate is disposed between a first surface and a second surface. A magnetic field applied to the conductive substrate through the first surface or the second surface induces an electric current in the conductive substrate. This electric current activates the heat-activated adhesive substrate and causes the heat-activated substrate to bond the first surface to the second surface.

In another aspect, an induction-heated adhesive layer involves a heat-activated substrate and a conductive substrate embedded within the heat-activated adhesive substrate. The heat-activated adhesive substrate is disposed between a first surface and a second surface. A magnetic field applied to the conductive substrate through the first surface or the second surface induces an electric current in the conductive substrate. This electric current activates the heat-activated adhesive substrate and causes the heat-activated substrate to bond the first surface to the second surface.

In yet another aspect, a method of induction heating of an adhesive layer involves placing a heat-activated adhesive substrate on a first surface. The heat-activated adhesive substrate comprises a conductive substrate. The method also involves placing a second surface on the heat-activated adhesive substrate. Then, the method involves applying a magnetic field through the second surface to induce an electrical current in the conductive substrate, thereby activating the heat-activated adhesive substrate and causing the adhesive substrate to bond the first surface to the second surface.

BRIEF DESCRIPTION OF THE DRAWINGS

The embodiments of this invention are illustrated by way of example and not limitation in the figures of the accompanying drawings, in which like references indicate similar elements and in which:

FIG. 2 is a diagram demonstrating an induction-assisted adhesive activation system, according to one or more embodiments.

FIG. 3A is a bottom view of an exemplary magnetic field generator, according to one or more embodiments.

FIG. 3B is a block diagram of an exemplary magnetic field generator, according to one or more embodiments.

FIG. 5 is a flowchart showing a method of induction-assisted heating of an adhesive layer, according to one or more embodiments.

Other features of the present embodiments will be apparent from the accompanying drawings and from the detailed description that follows.

DETAILED DESCRIPTION

Example embodiments, as described below, may be used to provide an inductive gluing sheet and a method for utilizing induction-based heating on the inductive gluing sheet to directly activate an adhesive layer therein after the sheet is placed between two objects. This generally involves using a composite material comprising a heat-activated adhesive layer and a conductive substrate embedded therein. An induction coil or any other magnetic field generator can be used to induce an electrical current in the conductive substrate through the surfaces, thereby activating the adhesive layer within which the conductive layer is embedded. This indirect activation method allows for more expedient workflow and facilitates reversibility of an installation process by vastly reducing the energy requirements for heating and cooling the adhesive layer. More importantly, this system categorically extends the utility of heat-sensitive adhesives to many construction and manufacturing environments (tiling, carpentry, woodwork, vinyl flooring, insulation, solar panels) but also materials that would normally be damaged by direct heating (such as fabric carpets, plastics, wood).

Figure 1:
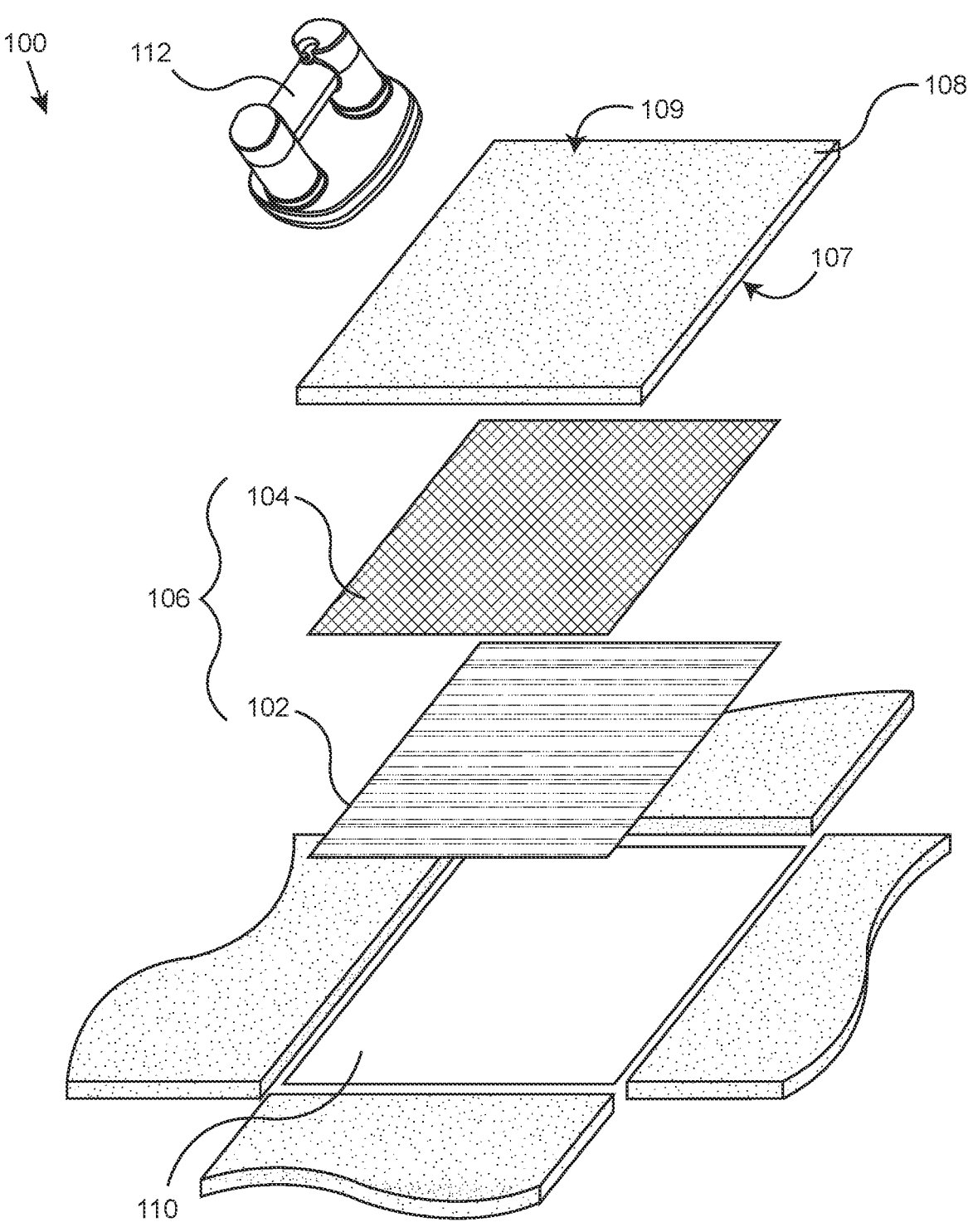
FIG. 1 is an exploded view diagram demonstrating an induction-assisted adhesive activation system, according to one or more embodiments.

Referring to FIG. 1, an exploded view diagram is shown demonstrating an induction-assisted adhesive activation system 100, according to one or more embodiments. In one embodiment, the induction-assisted adhesive activation system 100 comprises a heat-activated adhesive substrate 102. In one embodiment, the heat-activated adhesive substrate 102 may be made of ethylene vinyl acetate (EVA), amorphous poly alpha olefin (APAO), and/or polyamides (PA). These types of adhesives can be reheated and remelted in order to separate adhered objects. In another embodiment, the heat-activated adhesive substrate 102 may be made of a pre-mixed or single-component epoxy that activates upon being heated and cures indefinitely. In another embodiment, the heat-activated adhesive substrate 102 may retain a degree of flexibility after activation, allowing shear forces to dissipate. This is intended to replace typical uncoupling membranes such as DITRA underlayment sheets.

The induction-assisted adhesive activation system 100 also comprises a conductive substrate 104 which is embedded within the heat-activated adhesive substrate 102. The conductive substrate 104 may be a metallic grid, sheet, lattice, net, or other type of porous structure that allows the heat-activated adhesive substrate 102 to fill the spaces within and around. Each portion of the heat-activated adhesive substrate 102 may be in proximity to a portion of the conductive substrate 104 such that heat dissipating from the conductive substrate 104 may transfer evenly throughout the heat-activated adhesive substrate 102. Since the conductive substrate 104 is embedded in the heat-activated adhesive substrate 102, the two layers together constitute an inductive gluing sheet 106 which is deployable in the course of a typical workflow. As shown in FIG. 1, an internal surface 107 of an object 108 (such as tile, fabric carpet, plastics, wood, vinyl, wallpaper and other wall coverings, laminates, glass, insulation panels, solar panels, and others) is adhered to a receiving surface 110, the inductive gluing sheet 106 may be positioned onto the receiving surface 110 and the object 108 may be placed on the inductive gluing sheet 106. After ensuring the positioning and orientation of the object 108, a user may utilize a magnetic field generator 112 against an external surface 109 of the object 108 and activate the heat-activated adhesive substrate 102 as it moves along the external surface 109 as shown in FIG. 2. The process can be reversed by reheating the conductive substrate 104 via the magnetic field generator 112 and removing the object 108 once the heat-activated adhesive substrate 102 is re-activated.

Normally, to achieve the same result with a heat source such as a heat gun, the workflow would involve heating the external surface 109 convectively, and wait for the heat to conduct from the external surface 109, through a thickness of the object 108, to the internal surface 107, and subsequently through the thickness of the heat-activated adhesive substrate 102. This is a highly wasteful process since much of the heat dissipates through the external surface 109 as radiation and to the surrounding materials through conduction. It would also take an inordinate amount of time to fully heat up all portions of the heat-activated adhesive substrate 102 with a heat gun and fully activate the heat-activated substrate 102. Additionally, raising the temperatures of the surrounding materials would insulate the heat-activated adhesive substrate 102 and prevent it from cooling rapidly. Rather than indirectly heating up the heat-activated adhesive substrate 102 by applying heat externally through the object 108 and waiting for the heat to conduct to the heat-activated adhesive substrate 102, the induction-based heating system heats up the heat-activated adhesive substrate 102 directly by utilizing electromagnetic induction. Since the surrounding materials (the object 108, the receiving surface 110) are usually not heated by the magnetic field generator 112 because they are not conductive, they allow heat to dissipate rapidly from the heat-activated adhesive substrate 102, allowing for rapid cooling in the span of minutes instead of requiring overnight curing.

Referring to FIG. 3A, an exemplary magnetic field generator 112 is shown, according to one or more embodiments. FIG. 3 may show a bottom view of a base element 114 of the magnetic field generator 112. The magnetic field generator 112 may comprise a series of coils 116 which converts electric current energy therethrough into a magnetic field which induces an electric current in the conductive substrate 104 despite the depth of the conductive substrate 104. Referring to FIG. 3B, a block diagram of an exemplary magnetic field generator 112 is shown, according to one or more embodiments. The magnetic field generator 112 comprises the coils 116, a power supply 118, a processor 120, a memory device 122, an impedance sensor 124, and a display interface 126. The processor 122 may be a central-processing unit (CPU) or programmable logic controller (PLC) that may execute instructions stored in the memory device 122. The memory device 122 may comprise instructions to transmit an alternating current through the coils from the power supply 118 to generate a magnetic field and induce an electrical current in the conductive substrate 104. The memory device 122 may also comprise instructions involving detecting one or more eddy currents in the conductive substrate 104 induced by the magnetic field—this is achieved by measuring an impedance of the coils 116 through the impedance sensor 124 while a current is transmitted through the coils 116. The memory device 122 may also comprise instructions which when executed by the processor cause the magnetic field generator 112 to operate a control feedback loop which may involve toggling on/off the alternative current through the coils 116 based on continuous monitoring of the impedance of the coils 116. In a further embodiment, the control feedback loop may involve displaying an operation alert through the display interface 126. The operation alert may be an instruction to move the magnetic field generator 112 in a specific direction, move the magnetic field generator 112 slower or faster, or move the magnetic field generator 112 closer or further from the surface. In another embodiment, the memory device 122 may also comprise instructions which when executed by the processor cause the magnetic field generator 112 to automatically adjust a power and frequency of the alternating current transmitted through the coils 116 dynamically based on the impedance of the coils 116. Thus, the magnetic field generator 112 is able to adjust to the depth of the material between the magnetic field generator 112 and the conductive substrate 104.

Figure 4A:
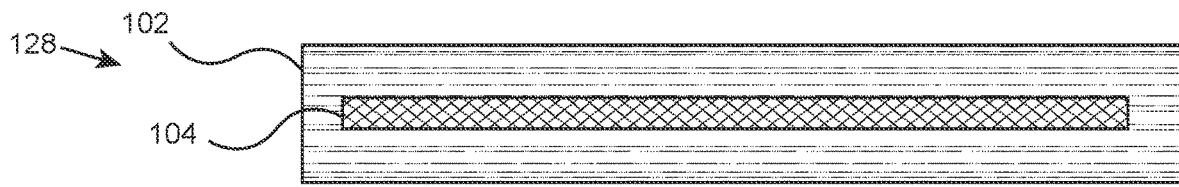
FIGS. 4A-C are cross-section views of exemplary inductive gluing sheets, according to one or more embodiments.
Figure 4B:
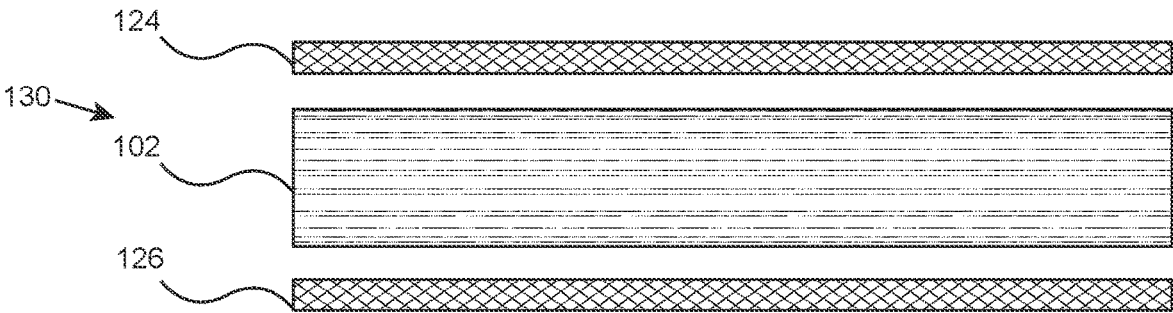
Figure 4C:
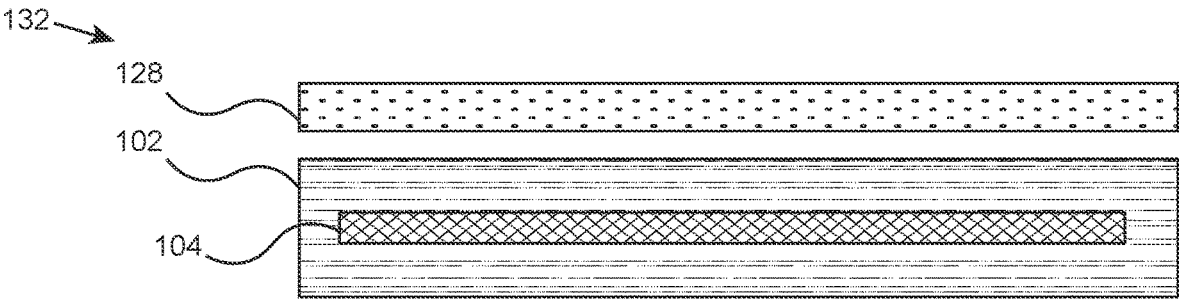

Referring to FIGS. 4A-C, inductive gluing sheets 128-132 are shown, according to one or more embodiments. In one embodiment, an inductive gluing sheet 128 may comprise a heat-activated adhesive substrate 102 within which a conductive substrate 104 is embedded. In this embodiment, the conductive substrate 104 is fully immersed in the heat-activated substrate 102, which is usually achieved by applying the heat-activated substrate 102 to the conductive substrate 104 in a liquid form and allowing it to harden. In another embodiment, an inductive gluing sheet 130 may comprise a heat-activated adhesive substrate 102 surrounded by a first conductive substrate 124 and a second conductive substrate 126. In this embodiment, the conductive substrates 124 and 126 surround the heat-activated adhesive substrate 102 and can conduct heat to the heat-activated adhesive substrate 102 from both sides. This may be preferable when the conductive substrate 124 and conductive substrate 126 are non-porous metallic sheets (such as aluminum foil). In yet another embodiment shown in FIG. 4C, an inductive gluing sheet 132 may comprise a heat-activated adhesive substrate 102 within which a conductive substrate 104 is embedded. Additionally, the inductive gluing sheet 132 may comprise a temporary contact adhesive 128 which may be used to hold the heat-activated substrate 102 and conductive substrate 104 in place before finally applying heat to the heat-activated substrate 102. This may be preferable for complex, upright design projects where a temporary installation may be desired to view the finished work before activating the heat-activated adhesive substrate 102. This may also be preferable when the heat-activated substrate 102 is a one-time use epoxy.

Referring to FIG. 5, a flowchart showing a method of induction-assisted heating of an adhesive layer is shown, according to one or more embodiments. In a first step 502, the method involves placing a heat-activated adhesive substrate on a first surface, wherein the heat-activated adhesive substrate comprises a conductive substrate. In a step 504, the method involves placing a second surface on the heat-activated adhesive substrate. In step 506, the method involves applying a magnetic field through the second surface to induce an electrical current in the conductive substrate, thereby activating the heat-activated adhesive substrate and causing the adhesive substrate to bond the first surface to the second surface.

What is claimed is:

1. A method of induction heating of an adhesive layer, comprising:

placing a heat-activated adhesive substrate on a first surface, wherein the heat-activated adhesive substrate comprises a conductive substrate embedded therein, the conductive substrate comprising a continuously metallic structure;

placing a second surface on the heat-activated adhesive substrate;

energizing an induction coil to apply a time-varying magnetic field through the second surface and induce eddy currents in the conductive substrate, thereby heating the conductive substrate and activating the heat-activated adhesive substrate and causing the adhesive substrate to bond the first surface to the second surface;

sensing an electrical impedance of the induction coil; and modulating at least one of a drive power or a frequency of the induction coil based on the sensed impedance to control heating of the conductive substrate.

2. The method of claim 1, wherein the heat-activated adhesive substrate comprises a semi-flexible adhesive.

3. The method of claim 1, wherein the conductive substrate is a thin metallic sheet.

4. The method of claim 1, wherein the conductive substrate is a porous metallic substrate.

5. The method of claim 1, wherein a geometry of the conductive substrate is configured to provide an uncoupling effect between the first surface and the second surface.

6. The method of claim 1, wherein after bonding, the first surface and the second surface are separable by energizing the induction coil to reheat the conductive substrate to reactivate the heat-activated adhesive substrate.

* * * * *